June 29, 1965 M. S. CURTIS ETAL 3,191,467
AUTOMATIC THREAD CUTTING MACHINE
Original Filed April 14, 1959 7 Sheets-Sheet 1

INVENTORS
MYRON S. CURTIS
HARRY SCHOEPE
EDWIN J. FISK
ATTORNEYS

INVENTORS
MYRON S. CURTIS
HARRY SCHOEPE
EDWIN J. FISK

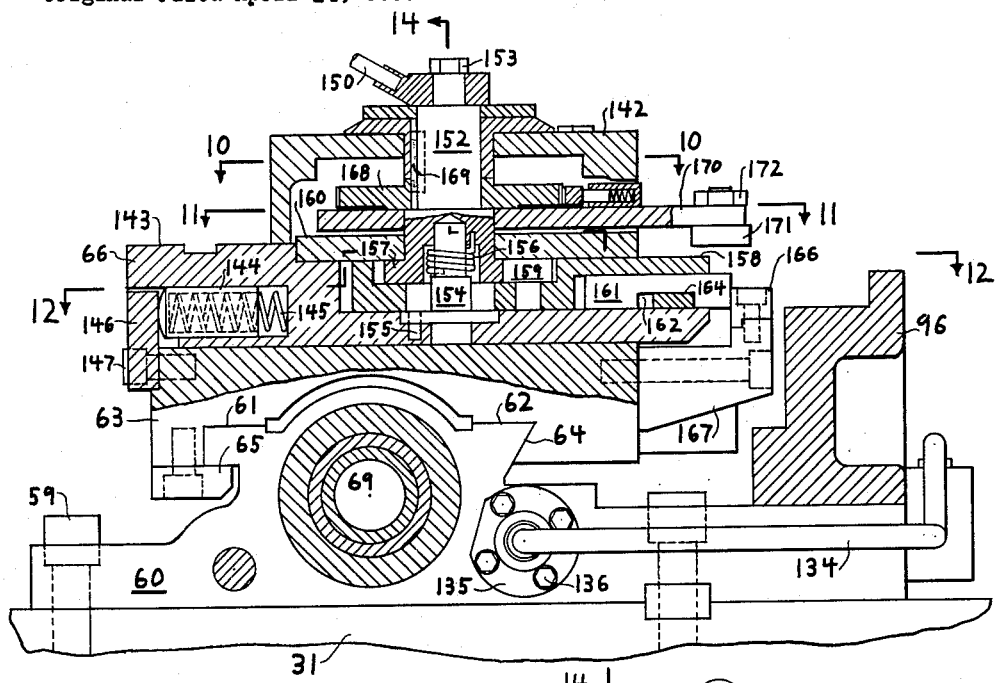

June 29, 1965 M. S. CURTIS ETAL 3,191,467
AUTOMATIC THREAD CUTTING MACHINE
Original Filed April 14, 1959 7 Sheets-Sheet 6

INVENTORS
MYRON S. CURTIS
HARRY SCHOEPE
EDWIN J. FISK

ATTORNEYS

3,191,467
AUTOMATIC THREAD CUTTING MACHINE

Myron S. Curtis, Santa Barbara, Calif., Harry Schoepe, Cleveland, and Edwin J. Fisk, Mayfield Village, Ohio, assignors to The Warner & Swasey Company, Cleveland, Ohio, a corporation of Ohio
Continuation of application Ser. No. 806,325, Apr. 14, 1959. This application Jan. 27, 1964, Ser. No. 340,482
13 Claims. (Cl. 82—5)

This invention relates to thread cutting and, more particularly, to automatic thread cutting machines of the type in which a single point cutting tool is used to cut threads on a rotating workpiece in several repetitive passes.

This application is a continuation of application Serial No. 806,325, filed April 14, 1959, now abandoned.

In the single point thread cutting process, a pointed cutting tool having a cutting edge conformable with the shape of the thread to be cut is advanced into the cutting position, fed along the axis of rotation at a uniform rate to generate the proper helix, retracted from the work, and then returned to the initial position. Successively deeper cuts are taken until the desired depth is obtained. As compared to other methods of producing screw threads, such as chasing with die heads and taps, thread rolling, and thread milling, single point threading offers many advantages such as high accuracy, excellent finish, versatility, and low tool cost. On large or unusually shaped pieces it often becomes the only method practicable, and on many other pieces it would be the most desirable method but for the disadvantages that heretofore it has been very slow in operation and not readily adaptable to automatic machining processes.

To overcome this slowness, several machines have been developed in recent years which cut screw threads by automatically repeating the cutting cycle until the thread is finished. However, these machines suffer the disadvantages of being special purpose machines, incapable of performing additional machining operations, and often requiring specialized cams, lead screws, etc., for each setup. As a result, the machines have been limited in their application to specialized uses and high production manufacturing.

It is an object of the present invention to provide a novel threading mechanism requiring little or no change of cams or lead screws for different lengths, pitches, or diameters of the thread or workpiece.

It is another object of the present invention to provide a novel automatic threading mechanism which can produce threads of a wide range of shape and pitch on diameters up to the maximum determined by the machine tool on which it is mounted.

It is a further object of the present invention to provide a novel and simplified structure for effecting the engagement and disengagement of the drive for moving a slide supporting a tool, such as a threading tool, through its work pass wherein the drive is disengaged at the end of the work pass in response to the release of latch means which holds in the drive and which is automatically released at the end of the work pass and the operation of spring means operating between the slide and its support and which has been loaded during the work pass to be effective to disengage the drive.

Yet another object of the present invention is to provide a new and improved threading attachment for a machine tool in which first cam means is shifted by stops at the opposite ends of the work pass to retract and advance a tool-carrying slide and wherein the mechanism shifted by the first cam means includes an adjustable length connection comprising second cam means which is operable to increase or decrease the length of the connection between the first cam means and slide by predetermined increments with the latter being operated in response to movement of the slide along the workpiece.

A still further object of the present invention is to provide in a machine tool a slide which is reciprocated along a path under the control of a snap-acting mechanism operated by abutments along the path of movement of the slide to effect a reciprocation of the slide.

Other objects and advantages of this invention will become apparent to those skilled in the art upon reading the following detailed description taken in conjunction with the drawings, in which:

FIG. 6 is a left, or headstock, side elevational view of the attachment partially in section to show the feed mechanism;

FIG. 7 is a right side elevational view of the attachment showing the ball screw detent mechanism;

Figure 3:
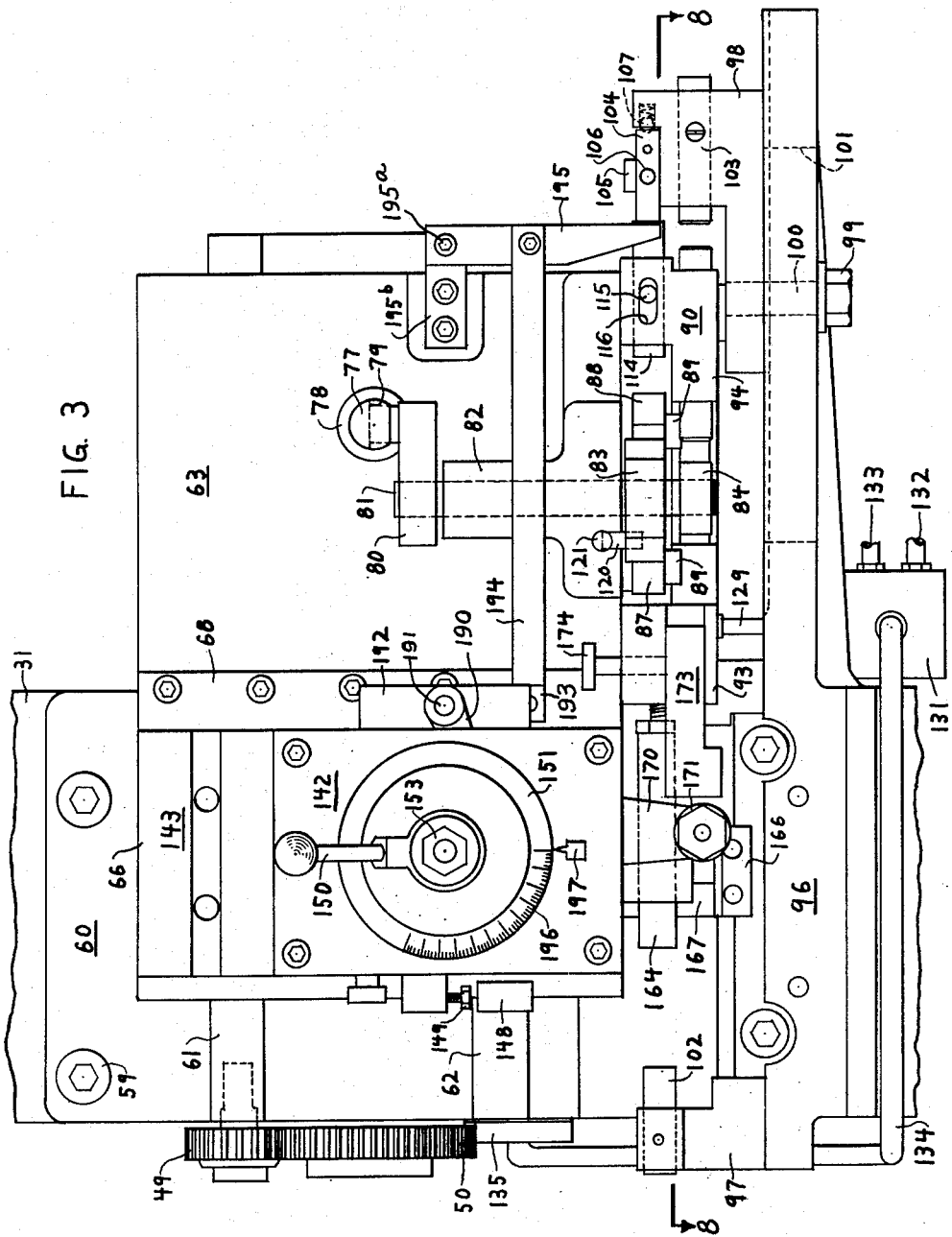
FIG. 3 is a fragmentary top plan view of the lathe and showing the attachment.
Figure 8:
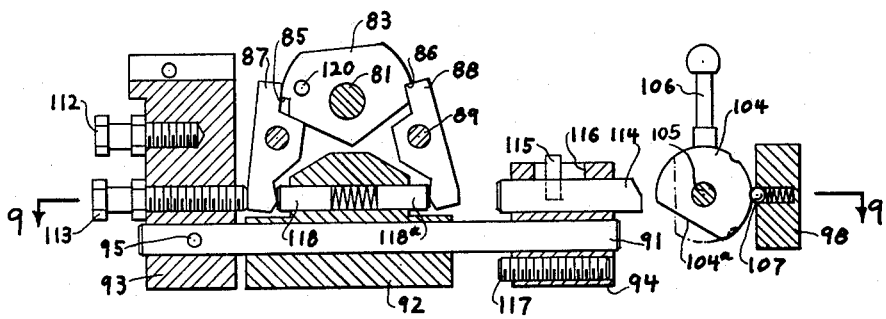
FIG. 8 is a section taken on line 8—8 of FIG. 3 showing the trip mechanism.
Figure 9:
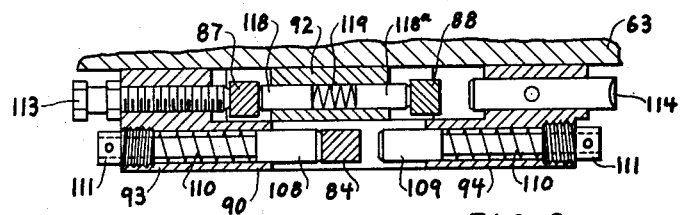
Figures 10, 15:
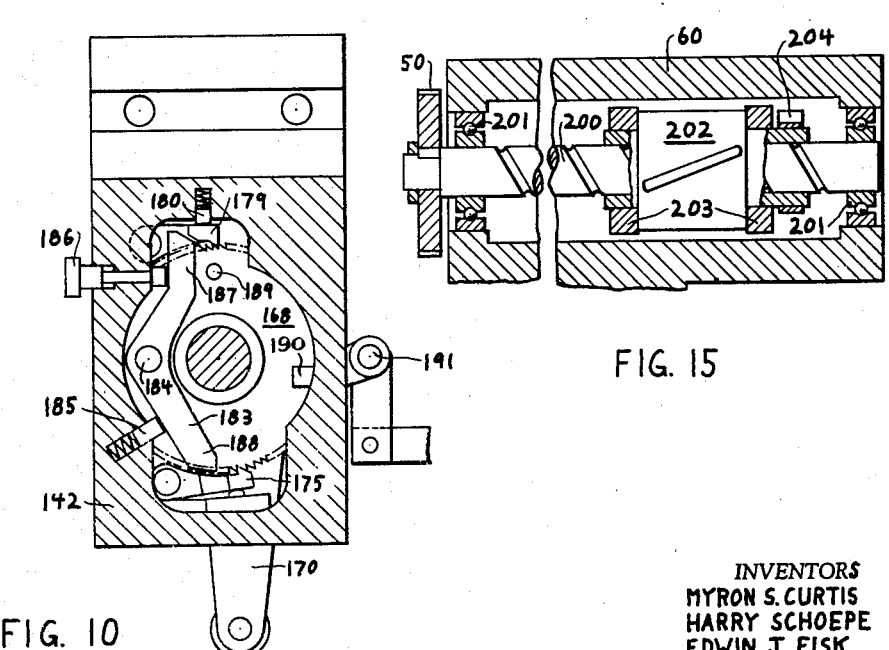
Figure 11:
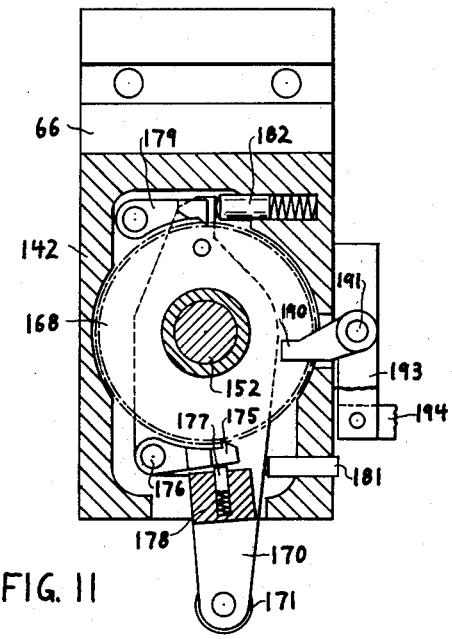
Figure 12:
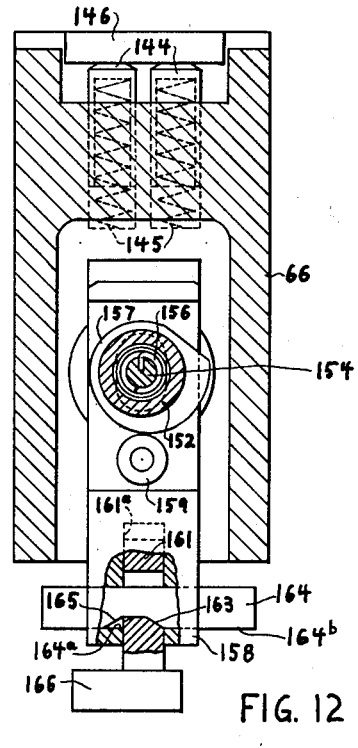
Figure 13:
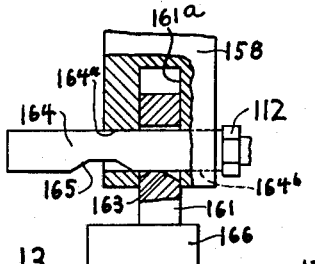
Figure 16:
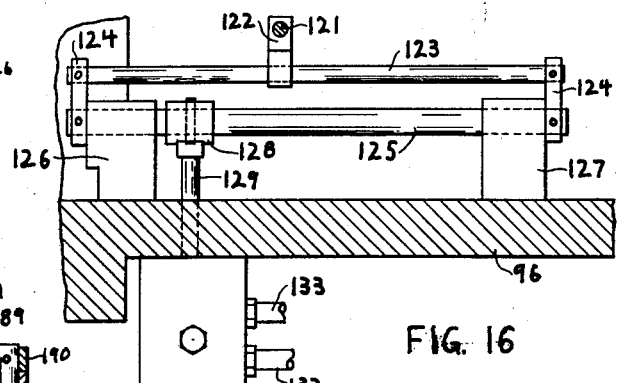
Figure 14:
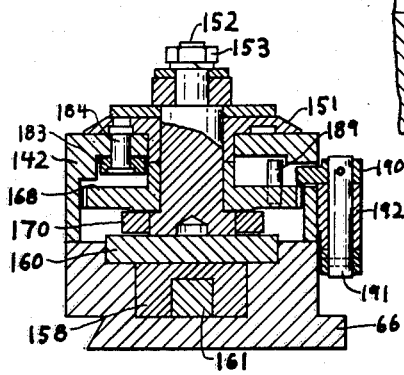
Figure 17:
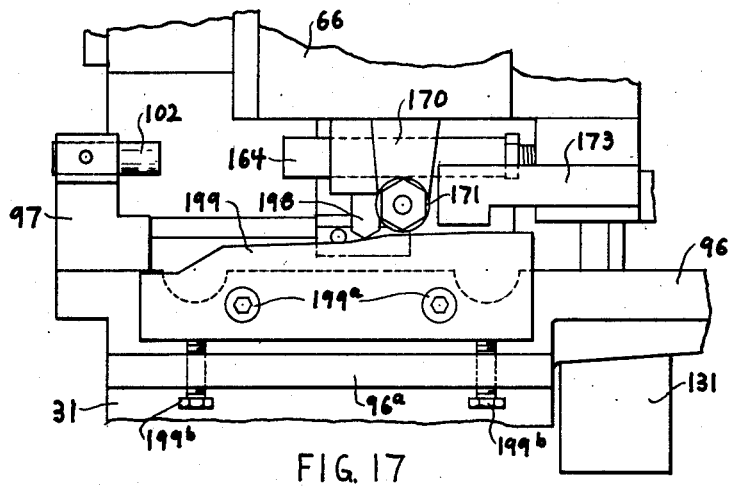
Figure 19:
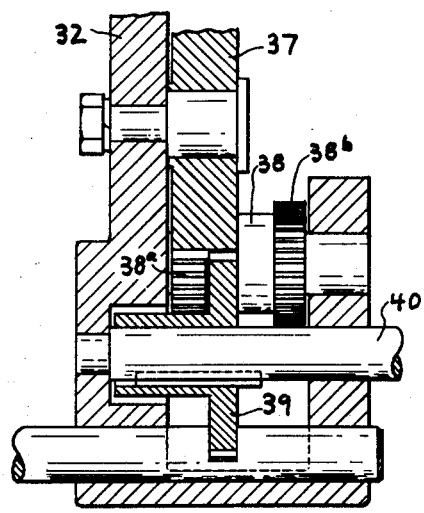
Figure 18:
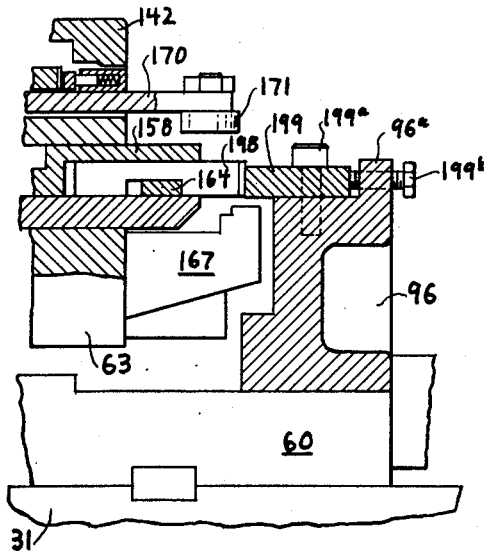

FIG. 9 is a section taken on line 9—9 of FIG. 8;
FIG. 10 is a section taken on line 10—10 of FIG. 6;
FIG. 11 is a section taken on line 11—11 of FIG. 6;
FIG. 12 is a section taken on line 12—12 of FIG. 6 with the cutter bar in the withdrawn position;

FIG. 13 is a fragmentary view of the cutter bar in the set position;

FIG. 14 is a section taken on line 14—14 of FIG. 6;
FIG. 15 is a sectional view similar to FIG. 4, but showing an alternative method of mounting the ball screw and nut mechanism;

FIG. 16 is a sectional view taken along line 16—16 of FIG. 7 showing the hydraulic valve operating mechanism;

FIG. 17 is a fragmentary plan view similar to FIG. 3 but showing a modification of the present invention;

FIG. 18 is a fragmentary sectional view similar to FIG. 6 but of the modification shown in FIG. 17; and FIG. 19 is a view showing part of the change gear set in the drive for the traverse slide.

In general, the preferred embodiment shown in the drawing is a self-contained unit which is attached on top of the cross slide of an engine lathe or turret lathe in the place of the regular tool holders. The unit is driven from the regular lathe feed shaft through a change gearbox and appropriate connecting drive shafts.

The attachment employs an antifriction ball screw and nut mechanism as a lead screw and follower in a manner similar to that disclosed in the application of M. S. Curtis, Serial No. 777,991, filed December 3, 1958, now Patent No. 3,023,631 and assigned to the assignee of the present application. This lead screw drives a traverse or longitudinal slide and is engaged and disengaged by a trip mechanism actuated at each end of the stroke. A feed slide, which carries the cutting tool, is mounted on the traverse slide and is provided with a tool withdrawal and reset mechanism as well as an adjustable infeed or advance mechanism which operates at the end of the return stroke of the traverse slide. The traverse slide is returned by a hydraulic cylinder whose actuation is controlled by the trip mechanism.

Figure 1:
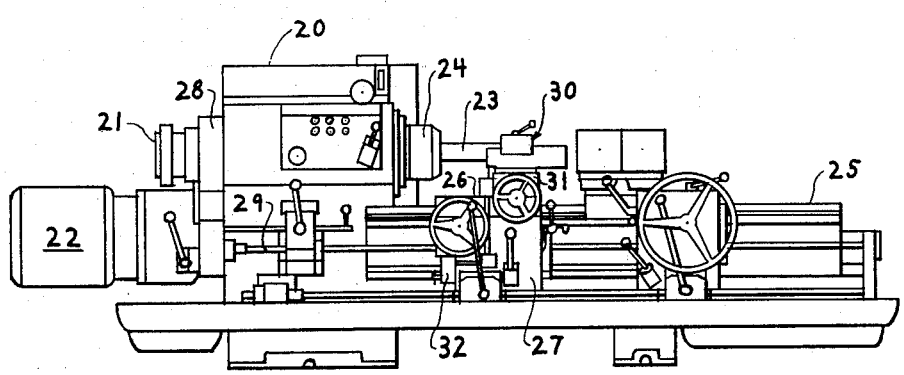
FIG. 1 is a front elevational view of a machine tool, in this case a turret lathe, having attached thereto a preferred embodiment of the present invention.

Referring now to the figures in greater detail, the turret lathe shown for illustrative purposes in FIG. 1 includes a head 20 in which is journaled a spindle 21. The spindle is rotated from a suitable power source, such as electric motor 22, connected to the spindle by suitable gearing in the head 20 to rotate a workpiece 23 secured in a chuck 24 on the front of the spindle. Ways 25 formed on a bed extend outwardly from the head parallel to the axis of the spindle and support a cross slide carriage 26 and its apron 27 for movement parallel to the spindle axis. The machine includes pick-off gears in a feed gearbox 28 located at the rear of the spindle to provide a timed drive for a feed shaft 29 passing through the apron 27. These parts are shown for illustration only and being generally common to all such machines will not be described in greater detail.

Figure 2:
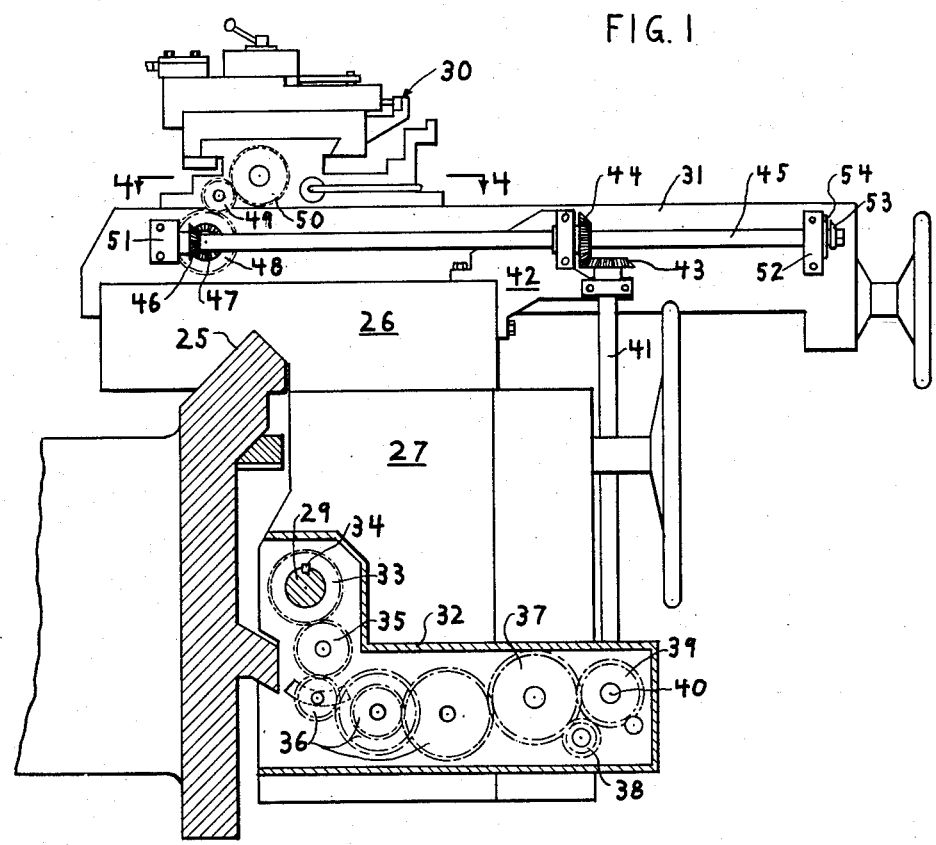
FIG. 2 is a side elevational view of the carriage apron of the lathe of FIG. 1 with the attachment thereon and showing the change gearbox and drive to the ball nut of the attachment.

The automatic threading mechanism which is the subject of this invention is shown generally at 30, being mounted on the upper surface of a conventional cross slide 31 carried by the carriage 26 for movement transversely of the spindle axis. The threading mechanism is driven from the feed shaft 29 in the manner shown, more particularly, in FIG. 2. A pick-off change gearbox 32 is secured to the side of the apron 27 and contains a gear 33 journaled in gearbox 32 and keyed to the feed shaft 29 for rotation therewith by a sliding key 34. The feed is transferred from the gear 33 by an idler gear 35 to a change gear set 36 which may be set up in the manner well known in the art to vary the output ratio of the change gearbox 32 relative to the rotation of feed shaft 29.

A gear 37 meshes with the last gear of the change gear set 36 and with a gear 38a of a reverse double gear 38. A sliding gear 39 is slidably splined on a transverse shaft 40 mounted on the gearbox 32 to selectively engage either the idler gear 37, the other gear 38b of reverse double gear 38, or remain in a neutral position. Transverse shaft 40 runs horizontally across the front of the apron and is drivingly connected to a vertical shaft 41 (see FIG. 2) whose upper end is journaled in bracket 42 on the carriage 26. The upper shaft 41 carries a bevel gear 43 which meshes with bevel gear 44 also journaled in bracket 42 and slidably keyed to a horizontal shaft 45. The shaft 45 is journaled at each end in bearing blocks 51 and 52 on the cross slide 31 and is slidable relative to the gear 44 so the shaft may be driven by the bevel gear 44 at any position of the cross slide.

The inner end of shaft 45 carries another bevel gear 46 which rotates therewith and which mates with a bevel gear 47 fixed to or formed on a gear 48 which is rotatably journaled on a stub shaft (not shown) secured to the cross slide 31. An idler gear 49 drivingly connects the gear 48 to a gear 50 on the threading mechanism 30. The drive set forth is illustrative of a suitable drive for the automatic threading mechanism as applied to an engine lathe or turret lathe. Other types of drive may be devised and may be found necessary when the invention is applied to other machine tools of the turning type such as automatic lathes and multiple spindle bar or chucking machines. The only essential requirement of the drive is that it must rotate gear 50 in timed relationship with the workpiece to be threaded.

Turning to the threading mechanism itself, as shown generally in FIGS. 3, 5, 6 and 7, it includes a base 60 which is bolted on the top surface of the cross slide 31 with cap screws 59. A pair of longitudinal ways 61 and 62 which extend parallel to the axis of the spindle 21 are formed on the top of the base 60 and a longitudinal or traverse slide 63 is slidably supported on the ways 61 and 62 by a dovetail surface 64 and cap 65 in the manner well known in the art. In like manner, a tool slide 66 is slidingly mounted on the traverse slide 63 by dovetail 67 and cap 68 for movement perpendicular to the spindle axis and ways 61, 62.

The gear 50 which has been described as driven from the feed shaft 29 is mounted on a hollow shaft 69 for rotation therewith and the shaft 69 (see FIG. 4) is journaled in the base 60 below the traverse slide 63 by spaced ball bearings 70. The traverse slide 63 has a depending portion 71 in which one end of a ball or antifriction screw 72 is journaled by ball bearing 73. The ball screw 72 meshes or cooperates with a mating ball nut 74 secured to the inner end of hollow shaft 69 for rotation therewith. This ball screw and nut combination provides the longitudinal feed to the traverse slide 63 in the manner described hereinafter. It should be noted that since the pitch of the thread being cut is independent of the pitch of the ball screw 72, the ball screw may have any pitch desired, but preferably it should be fairly coarse, e.g., one inch, to fully utilize the advantages of the ball screw as set forth in the above-identified application.

During the thread cutting cycle, the ball nut 74 is continuously rotated by the afore-mentioned drive mechanism. The speed of rotation of the ball nut determines the pitch of the thread to be cut on the workpiece, in that the ratio of the spindle speed to the ball nut speed is the same as the ratio between the pitch of the thread being cut and the pitch of the ball screw and nut mechanism. Accordingly, the pitch of the thread to be cut can be varied by means of the change gears in the change gearbox 32 in a manner similar to that used for the usual lathe lead screw.

So long as the ball screw 72 is free to rotate in its bearings 73, it will rotate together with the continuously driven ball nut 74 and no longitudinal motion will be imparted to the traverse slide 63. If, however, the ball screw 72 is locked or otherwise prevented from rotating in its bearings, continued rotation of the ball nut will then cause the nut to travel along the ball screw and move the traverse slide in the appropriate direction. When the ball screw is released, it will again rotate with the nut and no longer drive the traverse slide. A more detailed description of such a lead screw and nut has been given in the above-mentioned application of Curtis.

Since the traverse slide during the cutting pass always moves in one direction, toward the headstock of the lathe, it is necessary to lock the ball screw against rotation in only one direction. To do this, a pawl 75 is secured on the ball screw 72 adjacent to the bearings 73. This pawl has a contacting surface 76 which is rotatable into engagement with the lower end of a retractable plunger 77, when the latter is in its downward position, to prevent rotation of the ball screw in the one direction. Plunger 77 slides vertically within a sleeve 78 disposed in a vertical bore in the slide 63 and opening into the top of the slide.

The upper end of plunger 77 extends upwardly from the sleeve 78 and has a slot 79 which receives one end of an arm 80. The other end of the arm 80 is fixed to one end of a rocker shaft 81 which is journaled in a support portion 82 formed as a part of the traverse slide 63 (see FIG. 3). The other end of rocker shaft 81 has secured thereto a catch 83 and a lever 84, which form a part of a snap-action trip mechanism (see also FIGS. 8 and 9) to raise and lower plunger 77. The catch 83 is formed with notches 85 and 86 on opposite sides thereof and the notches are respectively engageable with the upper ends of latches 87 and 88 when the catch is moved to a respective one of two positions. The latch 87 engages the catch 83 when the catch is rocked clockwise to prevent counterclockwise movement thereof and the latch 88 engages the catch 83 when the catch 83 is rocked counterclockwise to the position shown in FIG. 8 to prevent clockwise movement thereof. It can be seen, therefore, that the latches 87, 88 are respectively engageable with the catch 83 to prevent rotation thereof from one limit position of the catch to the other limit position.

The latches 87, 88 are pivotally mounted on stub shafts 89 secured to the support portion 82, the stub shafts being shown in section in FIG. 8.

The trip mechanism includes a U-shaped trip frame or slide 90 fixed to a slide rod 91 slidable in a lug 92 which extends outwardly from the front side of traverse slide 63 and is carried thereby. The rod 91 extends parallel to the ways 61, 62 for the traverse slide 63 and to either side of the lug 92. The trip frame 90 is disposed outwardly of the front side of the traverse slide and has spaced arms 93 and 94 disposed on opposite sides of the lug 92 and in contcat with the front surface of traverse slide 63. The arms 93, 94 receive the slide rod 91 which is secured in the arm 93 by a pin 95. The lug 92 is not as wide as the space between arms 93 and 94 so that the trip frame is free to slide a short distance along the axis of the slide rod to assume either a right or left position as explained hereinafter.

A stop bracket 96 is secured to the base 60 forwardly of the traverse slide and projects upward in front of the trip frame and extends along the front of the traverse slide for the full length of its movement on the ways 61, 62. A fixed stop block 97 is secured to the end of the stop bracket toward which the traverse slide 63 moves during its work stroke and another stop block 98, adjustable to select the desired length of the cutting pass, is secured to the other end of the stop bracket by a nut 99 and a stud 100 which passes through a longitudinal slot 101 in the bracket. A stop rod 102 is pinned in position in fixed stop block 97 to shift the trip slide 90 and limit travel at the end of the cutting pass of the traverse slide. A similar but adjustable stop 103 is fastened in the adjustable stop block 98 by a lock screw and is disposed to engage the trip frame 90 and to limit the movement of the traverse slide at the end of the return stroke. Also mounted on adjustable stop block 98 is a control cam 104 supported on a stub shaft 105 and provided with an operating handle 106 projecting upward from its periphery. A spring loaded detent ball 107 is carried by the stop block 98 and is adapted to engage the control cam 104 to hold the cam disc in either one of two selectable positions. The purpose of the cam 104 is explained hereinafter.

Returning to the trip frame 90, a pair of spring-biased plungers 108 and 109 are slidably mounted in individual bores in arms 93 and 94, respectively, and extend outwardly from the inner side of the arms 93, 94 toward the lower end of the lever 84 carried by the rocker shaft 81. The plungers are spring loaded toward engagement with the lever by a spring 110 in the bore in which the plunger slides (see FIG. 9). The plungers extend through the arms 93, 94 and extend outwardly of the outer side thereof and have collars 111 on the outer ends thereof which limit movement of the plunger toward the lever 84.

In addition to the described structure, the trip frame includes an adjustable stop screw 112 screwed into the outer side of arm 93 (see FIG. 8) and below this is another adjustable stop screw 113 which extends inwardly through arm 93 so that its tip can contact the lower end of latch 87. Furthermore, a sliding stop rod 114 is supported in arm 94 so that its inner end can contact the lower end of latch 88 while its outer end can contact the periphery of the contact cam 104. The stop rod 114 is free to slide within arm 94, but its travel is limited by a pin 115 which is secured in stop rod 114 and projects upward through a slot 116 in the arm 94. To limit the distance of travel of the trip frame 90 relative to the traverse slide 63 in one direction, a stop screw 117 is fastened in the arm 94 below the slide rod 91 and projects inward to contact the side of the lug portion 92. To complete the trip mechanism, a pair of plungers 118 and 118a are slidably disposed in a bore extending through the lug portion 92 and the plungers extend from the opposite ends of the bore with their outer ends in contact with the lower ends of latches 87, 88. The plungers are urged apart and outwardly by a spring 119 which spring loads the latches so that their upper ends will snap into notches 85 and 86 on catch 83 when the latter has been rotated to a required position.

A pin 120 projects from the rear of the catch 83 adjacent to the notch 85 and fits within a slot on a link rod 121 which extends downwardly through support portion 82 of the traverse slide 63 (see FIGS. 3 and 7). The lower end of the rod 121 projects below the slide 63 and fits into a forked arm 122 (see FIG. 16). The forked portion of the arm 122 fits around a long rod 123 (see FIGS. 7 and 16) which is fastened at each end in support arms 124. The other ends of these support arms are pinned to a pivot rod 125 which is journaled in bearing blocks 126 and 127. A lever arm 128 is pinned on pivot rod 125 between the bearing blocks so that the rod 123, support arms 124, the pivot rod 125, and the lever arm 128 taken together form a bell crank linkage. This bell crank linkage remains stationary and movement of the traverse slide 63 causes the forked arm 122 to slide along the rod 123. Thus, the linkage can be actuated uniformly regardless of the position of the traverse slide.

Figure 4:
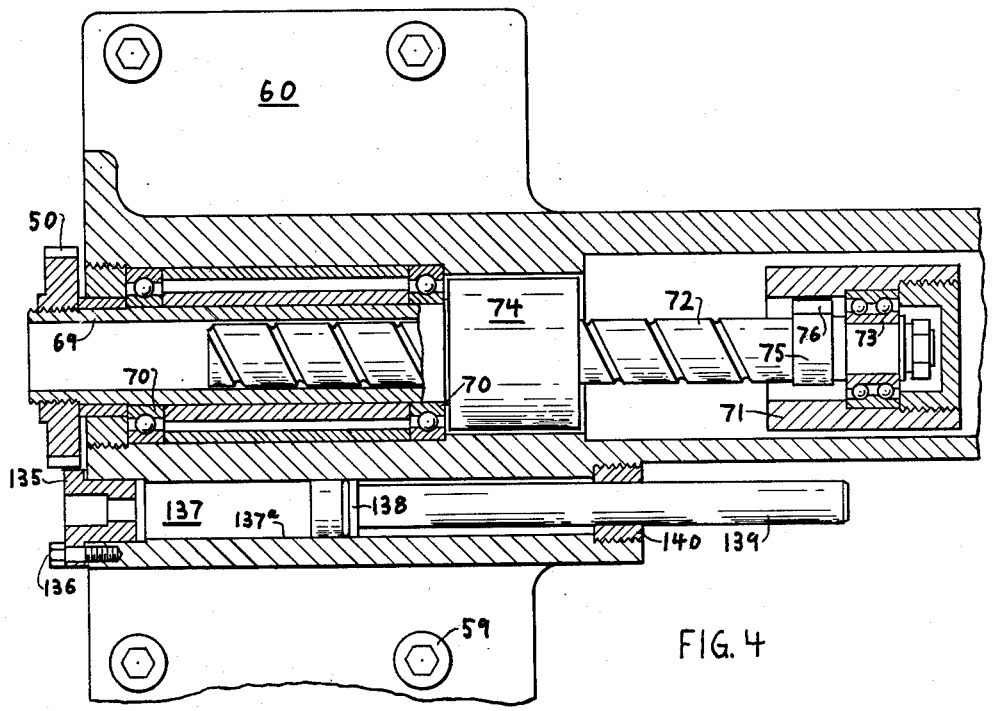
FIG. 4 is a sectional view taken on line 4—4 of FIG. 2 showing the mounting of the ball screw and nut mechanism.
Figure 5:
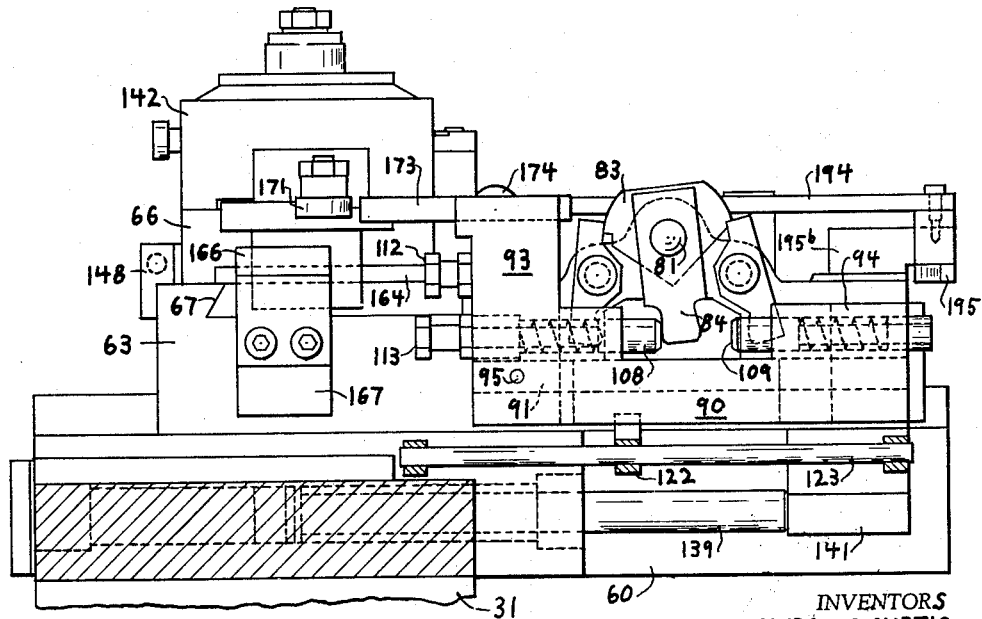
FIG. 5 is a fragmentary front elevational view of the lathe showing the attachment with certain parts, including the stop bracket, removed to better show the trip mechanism.

The lower end of arm 128 is forked to receive the end of valve rod 129 to which it is operatively connected by clevis pin 130. This valve rod actuates a three-port hydraulic valve 131 which is secured to the front of stop bracket 96. The valve may be of an appropriate commercially available type and hence its actual construction need not be described in greater detail here. A source of hydraulic pressure is connected to valve 131 through inlet port 132 and drain or return port 133. A hydraulic line 134 runs from valve 131 across base 60 and back to a cover plate 135 which is secured by screws 136 to the side of base 60 to cover and close one end of a single-acting hydraulic cylinder 137, best shown in FIG. 4. The cylinder element of this hydraulic cylinder is formed by a bore 137a in base 60 within which slides a piston 138. A rod 139 is secured at one end to piston 138 while its other end projects through a plug 140 for closing the bore 137a and makes contact with a lug 141 which depends from the underside of traverse slide 63, as is shown in FIG. 5. This hydraulic cylinder provides the return stroke for the traverse slide after the ball screw has been unlocked. At the end of the cutting pass the hydraulic valve 131 is actuated to allow hydraulic fluid from inlet port 132 to pass through line 134 into the cylinder. The resulting force on piston 138 is transmitted through rod 139 and lug 141 to the traverse slide to return the latter to the initial position. When the cutting pass is started, valve 131 connects line 134 to drain port 133, and movement of the traverse slide causes lug 141 to move piston 138 to empty the cylinder. Of course, other methods of returning the traverse slide, such as a spring return, may be used, but a hydraulic cylinder has the advantage of being relatively inexpensive and easily adapted since most modern machine tools already include a hydraulic system.

As stated above, the tool slide or support 66 is mounted on traverse slide 63 for reciprocable movement perpendicular to the spindle axis. A housing 142 on the front part of the tool slide contains the feed mechanism, as will be described in greater detail below. On the upper part of the slide, to the rear of cover 142, is a tool mounting surface 143 on which a suitable tool holder (not shown) can be mounted. A suitable cutting tool for cutting the desired thread is held in the tool holder, but since neither the cutting tool nor the tool holder forms any part of the present invention, they have not been shown or described, it being understood that suitable kinds are readily available in the trade.

Below the tool mounting surface 143, a pair of plungers 144 which are spring loaded by compression springs 145 are slidably fitted within individual recesses or bores in the feed slide, as is best shown in FIGS. 6 and 12. The outer ends of plungers 144 contact a block 146 which is fastened to the traverse slide 63 by screws 147. The plungers 144 and springs 145 serve to urge the feed slide and cutting tool away from the workpiece. The amount of travel is limited by a stop block 148 secured on the traverse slide 63 which is contacted by an adjustable stop screw 149 mounted on the tool slide, as is best shown in FIG. 3.

At the top of the housing 142 are a handle 150 and a dial plate 151 which are secured on the projecting end of a vertical shaft 152 by a nut 153. The lower end of the shaft 152 is pivoted on the upper end of a pivot shaft 154 (see FIG. 6) secured in the tool slide 66 and prevented from rotating by a pin 155. The upper end of the pivot shaft 154 fits within a socket in the lower end of shaft 152 to act as a support bearing for the shaft 152. A torsional helical spring 156 fits around pivot shaft 154 and has its lower end attached thereto while its upper end is secured in shaft 152 and urges the shaft 152 in a counterclockwise direction, as the shaft is viewed in FIG. 12.

A feed or advance cam 157 (see FIGS. 6 and 12) is fixed to the lower portion of shaft 152. Directly below the feed cam is a sliding or follower plate 158 which is free to slide relative to the tool slide a limited distance along a line parallel to the direction of movement of the tool slide relative to the traverse slide. A roller type cam follower 159 is secured on the upper surface of the plate 158 to contact the periphery of the feed cam 157. A bearing plate 160 (see FIG. 14) is fixed to the tool slide above feed cam 157 and journals shaft 152 so that the feed cam is rigidly positioned in the tool slide.

The sliding plate 158 projects out through the front face of the feed slide and a sliding follower 161 is movable in a slideway 161a in the sliding plate 158. The under surface of follower 161 is provided with a rectangular recess or cutout 162 having a cam surface 163 at the front. A bar cam 164 is slidably received in a slideway 164a in plate 158 for sliding movement parallel to the spindle axis and passes through recess 162. The front surface 164b of bar cam 164 has a notch 165 therein which is conformable to cam surface 163 and adapted to receive the same. The outer end of follower 161 projects beyond sliding plate 158 to contact a stop block 166 mounted on a bracket 167 secured to the front face of the traverse slide 63.

As will be appreciated from the foregoing, the compression springs 145 urge the tool slide away from the axis of the workpiece and toward the stop member 166. The stop member 166 limits the outward movement of the tool slide by reason of the fact that the feed cam 157 carried by the tool slide abuts its follower 159 which is carried by the plate 158, which, in turn, pushes against the cam bar 164 to urge the latter against the bar cam follower 163, with the latter being limited against outward movement by the stop 166. It can be seen that if the cam 157 is rotated, the distance between the axis of the cam and the axis of the cam follower 159 will be changed and the tool slide will either move toward or away from the axis, depending upon the direction of the throw of the cam 157. If the cam 157, as viewed in FIG. 12, is rotated in a clockwise direction, the tool slide 66 will be moved toward the axis against the action of the compression springs 145, and if rotated in a counterclockwise direction, the tool slide 66 will move away from the axis. It will be further appreciated that, independently of the operation of the feed cam 157, the shifting of the bar cam 164 will cause the bar cam to move toward or away from the axis of the workpiece, and if the bar cam moves toward the axis of the workpiece, it will push against the plate 158 to urge the tool slide toward the axis through the plate 158, the feed cam follower 159, and the feed cam 157. If the bar cam is moved to move the follower therefor along the front surface 164b into a position opposite to the notch 165, the springs 145 will operate to push the tool slide 66 and the plate 158 outwardly to maintain the edge of the bar cam 164 in engagement with the follower 163 and the follower against the stop member 166.

In order to provide an incremental rotational feed to shaft 152 and feed cam 157, a ratchet wheel 168 is mounted on the shaft 152 above the bearing plate 160 and is secured thereto by key 169, as is best shown in FIG. 11. Directly below ratchet wheel 168, a feed arm 170 is also mounted on shaft 152, but the arm is free to rotate on the shaft. The outer end of feed arm 170 is provided with a cam roller 171 on its lower surface, fastened there with a nut 172. As is best shown in FIG. 3, the roller 171 cooperates with the outer end of a feed bar 173, fastened on the top of arm 93 of trip frame 90, so that the outer end of the feed bar will contact the cam follower 171, as described in more detail below. The feed bar is adjustable relative to the arm 93 and a lockscrew 174 holds the feed bar in the desired position.

A drive pawl 175 (see FIG. 11) is mounted by a pivot pin 176 on the feed arm 170 and is spring loaded into contact with the teeth on the ratchet wheel 168 by a spring loaded plunger 177 in a block 178 mounted on the upper surface of the feed arm. A lock or stopping pawl 179 is mounted in the inside rear face of housing 142 and is held in contact with the ratchet wheel by spring plunger 180. Thus drive pawl 175, lock pawl 179, and ratchet wheel 168 form a ratchet mechanism whereby reciprocation of feed arm 170 stepwise rotates the feed cam against the action of torsion spring 156 to provide the necessary feed during cutting. The feed arm 170 is urged in a return direction to a normal position in contact with a stop 181 by a spring loaded plunger 182 supported by the tool slide 66.

A release for the ratchet mechanism is provided so that the tool slide may be returned by action of the spring 156. To effect a return of the slide, both pawls 175, 179 must be clear of the teeth on wheel 168. To this end, a lever 183 (see FIG. 10) is fulcrumed on a pivot pin 184 and is spring urged by a plunger 185 in a counterclockwise direction, as viewed in FIG. 10, and against a release plunger 186. The ends 187, 188 of the lever 183 are respectively positioned against the pawls 179, 175 and the depression of the release plunger effects rotation of the lever 183 to move the pawls clear of the ratchet wheel. Shaft 152 is then free to rotate back to the initial position either by action of spring 156 or by rotation of handle 150 as long as the plunger 186 is depressed.

The return movement of the shaft 152, and in turn the tool slide, is stopped by a pin 189 which projects above the upper surface of ratchet wheel 168. When the ratchet mechanism is released as described above, the pin serves as a stop when it rotates into contact with lever 183 to stop further rotation of the ratchet wheel. After the pin 189 engages the lever 183, release of the plunger 186 allows the pawls and ratchet wheel to re-engage. The pin 189 also functions to stop the cutting cycle after the thread has been fully cut. When the ratchet wheel has rotated to the point where the thread being cut has reached the full depth, the next feed increment will cause the pin 189 to contact and rotate an arm 190 which is fixedly mounted on a vertical shaft 191 journaled in a bracket 192 on the side of tool slide 66 and which extends into the path of the pin. As is shown in FIG. 3, a second arm 193 is secured to the lower end of the shaft 191 and its outer end is connected by a link rod 194 to a knock-off arm 195 pivotally mounted by clevis pin 195a on bracket 195b on the top of traverse slide 63. Thus rotation of arm 190 by pin 189 causes the knock-off arm 195 to rotate and strike operating handle 106 thereby rotating control cam 104 to the off position.

Turning now to the operation of the invention, the workpiece 23 to be threaded is held in chuck 24. Appropriate gears are installed in change gear set 36 to cut the required number of threads per inch. A tool holder having the proper cutting tool is mounted on tool mounting surface 143 and properly aligned.

The position of the attachment relative to the workpiece must now be adjusted longitudinally by movement of carriage 26 and transversely by movement of cross slide 31. It will be noted that the length of the cutting pass of the traverse slide is adjustable within limits so that time is not wasted by having an excessively long cutting pass as compared to the thread length. Since this adjustment is made by moving adjustable stop block 98 located at the starting point for the cutting pass, it will be seen that the end of the cutting pass always comes at the same point relative to base 60 and the cross slide. To position this point at the end of the portion to be threaded, traverse slide 63 is first moved to its position against stop 102 at the end of the cutting pass just before the tool slide is withdrawn. The carriage 26 is now moved along ways 25 until the cutting tool is located opposite the end of the portion of the workpiece to be threaded, after which the carriage is clamped in position in the usual manner.

The adjustment of the cross slide position can now be made to determine the finished thread diameter. As shown in FIG. 3, dial plate 151 has graduations 196 spaced around its periphery which register with a pointer 197 mounted on cover 142 to indicate the depth of feed. Since the knock-off point at which control cam 104 is turned to the off position is fixed with regard to the tool slide position as located by feed cam 157 these graduations may be used to back off the tool slide a measured distance from this position equal to the depth of the thread to be cut. After this is done, the cross slide 31 is moved inward until the cutting tool just touches the workpiece and then clamped in this position. Traverse slide 63 is then returned to the position agnist stop 103 at the beginning of the cutting pass.

The machine is now started and the drive from the spindle to ball nut 74 through change gearbox 32 is engaged in the afore-described manner. At this point the control cam 104 is in the off position so that the flat 104a is in contact with the sliding rod 114. The trip frame 90 is in the left position with its stop 117 in contact with lug 92. Trip frame 90 is also in contact with stop 103, and catch 83 is tilted so that latch 88 is positioned in notch 86. When catch 83 is in this position, plunger 77 is withdrawn from contact with pawl 75 allowing ball screw 72 to turn freely, and the pin 120 and its associated linkage has actuated the hydraulic valve 131 to energize the hydraulic cylinder 137 to hold the traverse slide 63 in this position. It may also be pointed out the bar cam 164 is in the position shown in FIG. 13 with its front surface 164b in contact with cam surface 163 to hold the tool slide in the advanced or cutting position.

To start the thread cutting operation, the machine operator rotates the control cam 104 to force sliding stop rod 114 to the left. Rod 114 then presses the lower end of latch 88 against the pressure of plunger 118a and spring 119 to rotate the latch and disengage its upper end from notch 86. Because the lower end of lever 84 is swung to the right and trip frame 90 is pushed to the left at this time, the lower end of lever 84 has compressed plunger 109 against its spring 110. As soon as latch 88 is disengaged from notch 86, plunger 109 then moves lever 84 to the left to rotate rocker shaft 81 and catch 83 in a clockwise direction. Catch 83 is rotated to a point where latch 87, under force from plunger 118, rotates its upper end into notch 85 to lock catch 83 and rocker shaft 81 in this position. Thus this portion of the trip mechanism serves as a snap-action mechanism to position catch 83 in either a right or left position.

As rocker shaft 81 is rotated into the cutting position, pin 120 lifts rod 121 and through the associated bell crank mechanism repositions hydraulic valve 131 connecting line 134 to drain port 133 and releases the pressure in hydraulic cylinder 137. At the same time, arm 80 is rotated to lower plunger 77 to a position where it will be contacted by surface 76 of pawl 75 as ball screw 72, being rotated with the ball nut 74, rotates the pawl into locking position. As soon as the ball screw 72 stops rotating, continued rotation of ball nut 74 produces screw action to move traverse slide 63 uniformly along its ways.

As the traverse slide reaches the end of the cutting pass, the bar cam 164 contacts fixed stop rod 102 on the carriage, and continued motion of the traverse slide causes the bar cam to slide longitudinally within the plate 158 until the cam surface 163 slips into the notch 165 therein, as shown in FIG. 12. When this happens, springs 145 push the tool slide away from the spindle axis to withdraw the tool from the workpiece. The continued movement of the traverse slide causes the stop screw 112 on the trip frame to engage bar cam 164 which is now held stationary by the stop rod 102 and further continued motion of the traverse slide shifts trip frame 90 into the right-hand position against the action of plunger 108 to reverse the trip mechanism. When the trip frame 90 is shifted to its right-hand position, the screw 113 contacts the lower end of latch 87 and rotates it until its upper end is disengaged from notch 85. As soon as this happens, plunger 108, which was engaged by the arm 84 prior to the engagement of screw 113 with latch 87 and which was compressed by the shift of the trip frame, pushes the lower end of lever 84 to the right to rotate the rocker shaft and catch until latch 88 engages notch 86. This rotation of the rocker shaft lifts plunger 77 to release the ball screw and, at the same time, actuates the valve 131 to admit pressure into the hydraulic cylinder. Since a ball screw mechanism is reversible, the resulting axial force on ball screw 72 will cause it to rotate relative to the traverse slide with little resistance. Thus piston 138 can push the traverse slide back to the right-hand position as the ball screw rotates freely in the same direction as the ball nut but at a greater rate.

When the traverse slide approaches the end of the return stroke, the sliding stop rod 114 carried by the trip frame 90 contacts the periphery of control cam 104 to bring the trip frame to rest. Further motion of the traverse slide shifts the trip frame to the left position relative to the traverse slide to first engage arm 84 with the plunger 109 to compress the latter and to engage stop rod 114 with latch 88 to release the catch for actuation by the plunger 109 to reverse the trip mechanism in the afore-described manner to initiate another cutting pass. At the same time, the shifting of the trip frame also causes stop screw 112 to push the bar cam 164 to the left. This forces cam surface 163 out of notch 165 and onto front surface 164b to move the tool slide back into the advanced or cutting position, as is shown in FIG. 13.

This next cutting pass is to be at a greater depth, so it is necessary to shift the tool slide inward an incremental distance to the desired depth of cut. As the trip frame is being shifted to the left at the end of the return stroke, the feed bar 173 carried by the trip frame contacts and rotates feed arm 170 of the feed ratchet mechanism. Drive pawl 175 thus rotates the ratchet wheel 168 through a number of teeth dependent upon the location of the feed bar on arm 93. The farther the feed bar projects, the greater the number of teeth by which the ratchet wheel will be advanced. After the ratchet wheel has rotated the required number of teeth, it is locked by the lock pawl 179, and the feed arm is returned by spring loaded plunger 182 to its position against stop 181 as soon as the trip frame is free to shift to the right.

After the required number of passes, the thread has been cut to the full depth and the ratchet wheel rotated to a point where pin 189 is almost in contact with arm 190. On the next return stroke of the traverse slide, the trip frame is moved to the left and the feed arm rotates the ratchet wheel in the above-described manner. Pin 189 then rotates arm 190 so that knock-off arm 195 strikes handle 106 and rotates operating cam 104 to the off position. As the latch 88 contacts the sliding stop 114 on the return stroke, the latter, no longer held in position by the operating cam, yields by sliding in arm 94 so that the trip frame comes to rest against stop 103 before latch 88 can be tripped. Thus, the trip mechanism cannot reverse and the traverse slide will remain in this position. The tool slide may be returned to its initial position by depressing release plunger 186 and rotating shaft 152 and the feed cam back to the starting position with handle 150.

It will be noted that the amount of feed of the tool slide depends on the shape of the feed cam 157 as well as on the position of the feed bar. In many cases, such as in cutting V threads, it is advantageous to have the first several cuts deep since they actually remove only a small volume of metal, in which case subsequent cuts have a diminishing amount of feed until the last pass which does little more than polish and true the thread surface. By selecting an appropriate contour for the feed cam, any such feed pattern may be easily obtained.

One of the advantages of this invention is that it can be readily adapted to cut tapered and special contour threads. To do so, the stop block 166 is removed from its mounting bracket 167 and in its place a template 199, having the desired taper or contour is fastened on the top surface of stop bracket 96 (see FIGS. 17 and 18) by cap screws 199a. A pair of adjusting screws 199b in the upstanding flange 96a of the stop bracket abut the rear edge of the template to provide a fine position adjustment. The standard follower 161 is removed and replaced by a follower 198 long enough to make a sliding contact with the template. Then, during the cutting pass, the feed slide will follow the template and cut a thread of the same taper or contour. It will be noted that the manner of supporting follower 163 and bar cam 164 eliminates relative longitudinal motion between the bar cam and follower during straight cuts when the stop 166 is utilized and facilitates the substitution of followers 161 and 198 when a taper is to be provided.

If it is desired to mount an ordinary cutting tool on the cross slide, the entire thread cutting attachment can be readily removed. All that is necessary is to disconnect the hydraulic lines 132 and 133 from valve 131 and remove the cap screws 59. The base 60 and its associated parts may then be removed, leaving the entire top surface of the cross slide available for tool mounting. The gear 48 does not project above the cross slide, so there is no interference from the drive mechanism.

Multilead threads may easily be cut without the addition of special equipment, using a method in which each lead is cut completely before the next one is started, and the lead screw mechanism is then indexed to the proper position for the next lead. The gear train from the transverse shaft to the ball nut 74 is preferably of a 1:1 ratio at all points so that sliding gear 39, shaft 45 and the ball nut maintain the same angular relationship. After the first lead of the multilead thread has been cut, the spindle is stopped to bring the feed shaft and change gears to a stop while maintaining their angular relationship to the spindle. The sliding gear 39 is now shifted to the neutral position and shaft 45 is rotated by hand through an angle equal to the angular displacement of the lead to be cut, after which the sliding gear is re-engaged. To aid the operator in obtaining the correct angular displacement, shaft 45 carries a pointer 53 on its front end which registers on a dial plate 54 on front bearing block 52. This method allows any multilead thread to be cut so long as the number of leads is a factor of the number of teeth on sliding gear 39.

An alternative embodiment of the ball screw and nut mechanism is shown in FIG. 15. In the first-described embodiment, the ball screw is only journaled at one end, as is shown in FIG. 4. Normally, this is satisfactory so long as the ball screw is relatively short, but for relatively long screws such a mounting may allow an undesirable amount of whip or deflection. The deflection can be greatly decreased by providing bearings at both ends of the ball screw. As shown, a ball screw 200 is journaled at each end by bearings 201 in the base 60 and is driven by the gear 50 in the same manner as was ball nut 74 in the preferred embodiment. A mating ball nut 202 is mounted on the ball screw 200 and is also journaled in a suitable depending housing 203 of the traverse slide 63.

The feed is engaged by locking ball nut 202, and accordingly, a pawl 204, similar in function to pawl 75, is secured on the ball nut to be contacted by a suitable plunger similar to plunger 77. The remainder of the structure and operation of this embodiment is the same as that of the embodiment shown in FIGS. 1–14 and hence is not shown nor given further description.

Other embodiments and modifications may be made within the scope of the invention as set forth in the following claims.

Having described our invention, we claim:

1. In a threading mechanism, a slide reciprocable in opposite directions along a first path to effect movement of a tool carried thereby in work and return passes, power actuated means for effecting movement of said slide along said path, control means on said slide for said power actuated means comprising a control member having first and second positions for effecting operation of said power actuated means in first and second directions respectively along said path, operating means for said control member including snap-acting mechanism on said slide and operable between two positions and having normally engaged latch means for preventing operation of said mechanism and means for operating the mechanism upon the release of said latch means, means operatively connecting said mechanism to said control member to actuate the latter between its said positions upon actuation of said mechanism between its said positions, said mechanism including a trip member supported on said slide for movement relative thereto between first and second positions to effect a release of said latch means and actuation of said snap-acting mechanism between its said positions, stop means adjacent said slide at the end of each of said passes for holding said trip member against movement with said slide to produce relative movement therebetween and to actuate said snap-acting mechanism to a respective one of its positions, said means for actuating said snap-acting mechanism comprising a spring which is loaded to operate said mechanism in response to movement of said slide to said stop means.

2. In a threading mechanism, the structure as defined in claim 1 wherein the tool carried by said slide is mounted on a tool support and said tool support is mounted on said tool slide for advancing and retracting movement transversely of said path and the structure further comprises a cam bar carried by said slide and shiftable independently of said trip member in one direction relative to said slide parallel to said path to advance said tool support and in the opposite direction to retract said tool support, and stop means along said path for shifting said bar.

3. A mechanism for stopping the movement of a first slide along a path in one direction comprising a rocker member, means mounting said rocker member on said slide for rocking movement relative thereto in opposite directions between two positions, a releasable locking means on said slide including a movable latch engageable with said rocker member upon rocking movement of said member in a first direction to its said first position to releasably hold said member against movement thereof in the opposite direction to its said second position and releasable to permit movement of said rocker member in its said opposite direction to its said second position, control means operated by the movement of said rocker member to its said second position to stop movement of said slide along said path in its said one direction, a slide member on said first slide, means supporting said slide member for movement relative to said first slide parallel to said path in one direction to engage and effect a release of said latch, a first part on said slide member and a cooperating part on said rocker member being engageable upon movement of said slide member in said one direction to move said rocker member from its said first position to its said second position, means resiliently mounting said first part on said slide member, said first part being disposed to engage said cooperating part on said rocker member in advance of the engagement of said slide member with said latch, and abutment means adjacent said path and engageable with said slide member to move the latter into engagement with said rocker member and said latch as said first slide moves thereby.

4. A mechanism as defined in claim 3 wherein said control means operated in response to the movement of said rocker member effects operation of said first slide in the opposite direction along said path in a return movement and when operated to said second position from its said first position, and which further comprises a second latch engageable with said rocker member when in its said second position to prevent movement thereof in said first direction and movable to release said rocker member for movement in its said first direction, a second part resiliently carried by said slide member and engageable with said rocker member when the slide member is moved in said return movement to move said rocker member in its said first direction, a latch release member on said slide member and engageable with said second latch upon relative movement between said latch release member and first slide opposite to said one direction of relative movement of said slide member, and stop means adjacent the path of movement of said first slide and displaced from said first stop means in the direction of return movement, said stop means being operable when said slide is moving in a return direction to prevent movement of said slide member and latch releasing member with said first slide, said control means including means for stopping said return movement in response to the movement of said rocker member to its said first position.

5. In a mechanism having a slide reciprocable along a first path in work and return passes and a tool support on said slide, said tool support being movable relative thereto transversely of said path toward and away from a work axis to control the displacement of a tool thereon relative to a workpiece, a spring urging said tool support away from the work axis, a bar cam element and cooperating bar cam follower element, means supporting said elements for relative movement parallel to said path and connecting one of said elements to said support for movement therewith away from said axis and to effect movement of said slide toward said axis upon movement of said one element toward said axis, a stop member disposed outwardly of said one element in a direction away from said axis, the other of said elements being disposed between said stop member and the said one of said elements whereby said spring urges said one element into engagement with the other of said elements and said stop member limits the outward movement of both of said elements, means supporting said elements for relative movement parallel to said path, stationary abutment supported respectively at opposite ends of said path and disposed to engage one of said elements to relatively shift said elements upon movement of said slide to the respective end of the path, said bar cam element having a cam surface with a throw such that said support is moved away from said axis when the bar cam element and follower element are relatively shifted by the one of said abutments at the end of said path corresponding to the end of its work pass and toward said axis when relatively shifted in the opposite direction by the other of said abutments.

6. In a mechanism as defined in claim 5 wherein said bar cam element is supported for relative movement with respect to said slide parallel to said path and said follower element is disposed between said bar cam element and said stop member and is connected to said support for movement therewith parallel to said path and for movement relative thereto transversely of said path.

7. In a machine having a slide which is reciprocated along a first path and is movable along a second path extending transversely of said first path, and is biased in one direction along said second path, mechanism for effecting movement of said slide along said second path in opposition to the bias on said slide comprising a cam bar extending parallel to said first path and engaging a part of said slide to limit movement thereof in said one direction along said second path when said bar is held against movement in said one direction, means supporting said bar for sliding movement relative to said slide and parallel to said first path, a bar cam follower supported on said slide for movement therewith along said first path and for movement relative thereto parallel to said second path, a stop member displaced from said cam bar in said one direction, and means connecting said stop member to said slide for movement therewith along said first path, said cam follower having a cam follower portion disposed between and engaging said cam bar and said stop member and said bar having a cam surface formed on the side thereof engaged by said cam follower portion whereby relative movement between said follower and cam bar upon movement of the latter relative to said slide and parallel to said first path effects movement of said slide along said second path.

8. In a threading mechanism having a support reciprocable along a first path in work and return passes and a tool slide on said support movable relative thereto transversely of said path toward and away from a work axis to control the displacement of a tool thereon relative to a workpiece, a spring urging said tool slide away from the work axis, a bar cam element and cooperating bar cam follower element, a second slide supported on said tool slide for movement toward and away from said workpiece, means mounting one of said elements on said second slide for movement of said second slide toward said axis upon movement of said element toward said axis, a displacement cam having an increasing throw when rotated in one direction, means mounting said displacement cam on one of said slides for rotation about a fixed axis, a cam follower engaging said displacement cam and on the other of said slides, said displacement cam and cam follower being disposed on said slides whereby said spring urges the one thereof on said tool slide toward the one on said second slide, a stop member carried by said support and disposed outwardly of said one element in a direction away from said work axis, the other of said elements being disposed between said stop member and the said one of said elements whereby said spring urges said one element into engagement with the other of said elements and said stop member limits the outward movement of both of said elements, and stationary abutments supported respectively at opposite ends of said path and disposed to hold said bar cam element against movement with said support upon movement of said support to the respective end of the path to provide relative movement between said second slide and said bar cam element, said bar cam element having a cam surface with a throw such that said second slide is moved away from said work axis when the bar cam element is shifted by the one of said abutments at the end of said path corresponding to the end of its work pass and toward said work axis when shifted in the opposite direction by the other of said abutments.

9. In a threading mechanism, the structure as defined in claim 8 and which further comprises a ratchet mechanism for effecting incremental rotation of said displacement cam, said ratchet mechanism including a ratchet wheel rotatably mounted on said slide mounting said displacement cam and connected to rotate said wheel and movable in one direction to advance said wheel in one direction, a drive pawl disposed to engage said wheel and movable in one direction to drive the wheel in its said one direction and idling over said wheel when moved in the opposite direction, a stop pawl engaging said wheel and permitting rotation thereof in its said one direction and preventing rotation theerof in its said opposite direction, a reciprocable lever extending from said mechanism and operatively connected to said drive pawl for moving said drive pawl and operable in one direction to move said drive pawl in its said one direction, said lever extending outwardly to a position to be actuated by said abutment at the end of the return path.

10. In a machine tool, a support movable along a first path, a slide on said support movable relative thereto along a second path transversely of said first path, spring means urging said slide in one direction along said second path, limit means determining the movement of said slide by said spring means and the position of said slide along said second path comprising a member on said support and an adjustable length connection between said member and said slide providing an abutment against which said slide is urged with the length of said connection determining the position of said slide along said second path, said connection comprising a cam element and a cam follower element on said slide and relatively shiftable from and to a predetermined position to vary the length of said connection between said member and slide to move said slide in opposite directions along said second path by a predetermined increment and a displacement cam and a cooperating follower, one of said displacement cam and cooperating follower providing said abutment and being on said adjustable connection to be movable thereby and the other of said displacement cam and cooperating follower being on said slide with said displacement cam being adjustable to vary the length of said connection to shift said slide independently of the position of said cam element and cam follower element.

11. In a threading attachment: a support member movable along a first linear path, a slide member supported on said support member for movement along a second path transversely of said first path; spring means connected between said support member and slide member and urging said slide member in one direction along said second path; a fixed member on said support member and disposed to limit the movement of said slide member by said spring means; an adjustable length connection between said fixed member and said slide member for limiting the movement of said slide member by said spring means along said second path to a position determined by the length of said connection; said connection including a slidable member on said slide member, first cam means rotatable to vary the length of said connection and comprising a cam and cam follower, one of which is on said slide member and the other on said slidable member, and second cam means shiftable to and from a predetermined position to respectively increase and decrease the length of said connection by a predetermined increment; said second cam means comprising a cam bar element and a cam follower element, one of said elements being movable with said slidable member and the other disposed between said fixed member and said one of said elements and said cam bar element extending in the direction of said first path, one of said elements being shiftable longitudinally of said first path to shift said second cam means from and to said predetermined position.

12. In a machine tool, a first slide reciprocable along a first path, a rocker member movable from a first position to a second position, a releasable locking means on said slide including a movable latch engageable with said rocker member upon rocking movement of said member in a first direction to its first position to releasably hold said member against movement in the opposite direction to its said second position and releasable to permit movement of said rocker member to its said second position, control means operated by the movement of said rocker member to its said second position to perform a control operation affecting the movement of said slide, trip means along said path for engaging said latch and tripping the same on movement of said slide to a predetermined position along said path, a first part along said path and a cooperating part on said rocker member engageable upon movement of said slide in said one direaction along said path to a second predetermined position, resilient means supporting one of said parts and yieldably opposing movement of said one part by the other part when said parts are engaged with said rocker member latched in its said first position whereby said resilient means loads said rocker member upon continued movement in said one direction after engagement of said parts and said resilient means tends to move said rocker member from its said first position to its said second position, said first part being disposed to engage said cooperating part in advance of the movement of said slide to its first said predetermined position.

13. In a threading mechanism, a support, a slide reciprocable on said support in opposite directions along a first path to effect movement of a tool carried thereby in work and return passes, a power-actuated drive for effecting movement of said slide along said path in its work pass, said slide including a member connected with said slide to be movable therewith from the start of the work pass toward the end of the work pass and movable between first and second positions for respectively effecting engagement and disengagement of said power-actuated drive, releasable locking means including a latching part engageable with said member when the latter is in its drive-engaged position to latch said member in its drive-engaged position and prevent movement thereof to its drive-disengaged position and released in response to movement of said slide to the end of its work pass, spring means connected to operate between said support and said member to move said member to its drive-disengaged position at the end of its work pass upon the release of said locking means and including a part on one of said support and member and a cooperating part on the other of said support and member engaged during said work pass to load said spring means to actuate said member in response to movement of said slide to the end of said work pass.

References Cited by the Examiner
UNITED STATES PATENTS
230,629  8/80  Grant _____ 82—5

WILLIAM W. DYER, Jr., *Primary Examiner.*